(12) United States Patent
Ota et al.

(10) Patent No.: US 10,439,214 B2
(45) Date of Patent: Oct. 8, 2019

(54) COATED LITHIUM-NICKEL COMPOSITE OXIDE PARTICLES AND METHOD FOR PRODUCING COATED LITHIUM-NICKEL COMPOSITE OXIDE PARTICLES

(71) Applicant: SUMITOMO METAL MINING CO., LTD., Tokyo (JP)

(72) Inventors: Yosuke Ota, Chiba (JP); Hidetoshi Yamabe, Chiba (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 28 days.

(21) Appl. No.: 15/325,596

(22) PCT Filed: Jul. 9, 2015

(86) PCT No.: PCT/JP2015/069726
§ 371 (c)(1),
(2) Date: Jan. 11, 2017

(87) PCT Pub. No.: WO2016/009931
PCT Pub. Date: Jan. 21, 2016

(65) Prior Publication Data
US 2017/0149058 A1    May 25, 2017

(30) Foreign Application Priority Data

Jul. 14, 2014  (JP) .................................. 2014-144511
Jul. 14, 2014  (JP) .................................. 2014-144512
Jul. 14, 2014  (JP) .................................. 2014-144513

(51) Int. Cl.
*H01M 4/36* (2006.01)
*H01M 4/525* (2010.01)
(Continued)

(52) U.S. Cl.
CPC ......... *H01M 4/366* (2013.01); *H01M 4/1391* (2013.01); *H01M 4/525* (2013.01); *H01M 4/62* (2013.01); *H01M 2004/028* (2013.01)

(58) Field of Classification Search
None
See application file for complete search history.

(56) References Cited

U.S. PATENT DOCUMENTS

2003/0049529 A1    3/2003  Cho
2009/0194747 A1    8/2009  Zou
(Continued)

FOREIGN PATENT DOCUMENTS

EP    2741356 A1    6/2014
JP    2003-142097 A1    5/2003
(Continued)

OTHER PUBLICATIONS

International Search Report for International Application No. PCT/JP2015/069726 dated Oct. 13, 2015.
(Continued)

*Primary Examiner* — Alix E Eggerding
(74) *Attorney, Agent, or Firm* — Kratz, Quintos & Hanson, LLP

(57) ABSTRACT

To provide excellent lithium-nickel composite oxide particles which have high environmental stability and are thus capable of suppressing generation of impurities due to absorption of moisture and a carbon dioxide gas, while being prevented from easy separation of a coating film because of high adhesion thereof and having lithium ion conductivity. Coated lithium-nickel composite oxide particles, which are obtained by coating the surfaces of lithium-nickel composite oxide particles with a predetermined coating material, have electrical conductivity and ion conductivity and are capable of suppressing permeation of moisture and a carbon dioxide (Continued)

gas. Consequently, the present invention is able to provide coated lithium-nickel composite oxide particles for positive electrode active materials of lithium ion batteries, which is excellent for use in lithium ion batteries.

8 Claims, 1 Drawing Sheet

(51) Int. Cl.
*H01M 4/62* (2006.01)
*H01M 4/1391* (2010.01)
*H01M 4/02* (2006.01)

(56) References Cited

U.S. PATENT DOCUMENTS

| | | | |
|---|---|---|---|
| 2012/0261610 A1 | 10/2012 | Paulsen | |
| 2012/0321948 A1* | 12/2012 | Oya | H01M 4/0404 429/211 |
| 2013/0181160 A1 | 7/2013 | Wietelmann | |
| 2014/0079995 A1 | 3/2014 | Wakada | |
| 2014/0127547 A1* | 5/2014 | Park | H01M 10/4235 429/144 |
| 2014/0287301 A1* | 9/2014 | Yushin | H01M 4/366 429/188 |
| 2014/0370346 A1* | 12/2014 | Okumura | H01M 4/131 429/94 |
| 2016/0149216 A1 | 5/2016 | Mizuno | |

FOREIGN PATENT DOCUMENTS

| | | |
|---|---|---|
| JP | 2011-511402 A1 | 4/2011 |
| JP | 2013-179063 A1 | 9/2013 |
| WO | 2011/105126 A1 | 9/2011 |
| WO | 2012/165422 A1 | 12/2012 |
| WO | 2015/005117 A1 | 1/2015 |

OTHER PUBLICATIONS

Extended European Search Report for counterpart EPC Patent Application No. 15822794.2 dated Nov. 20, 2017 (8 Sheets).

* cited by examiner

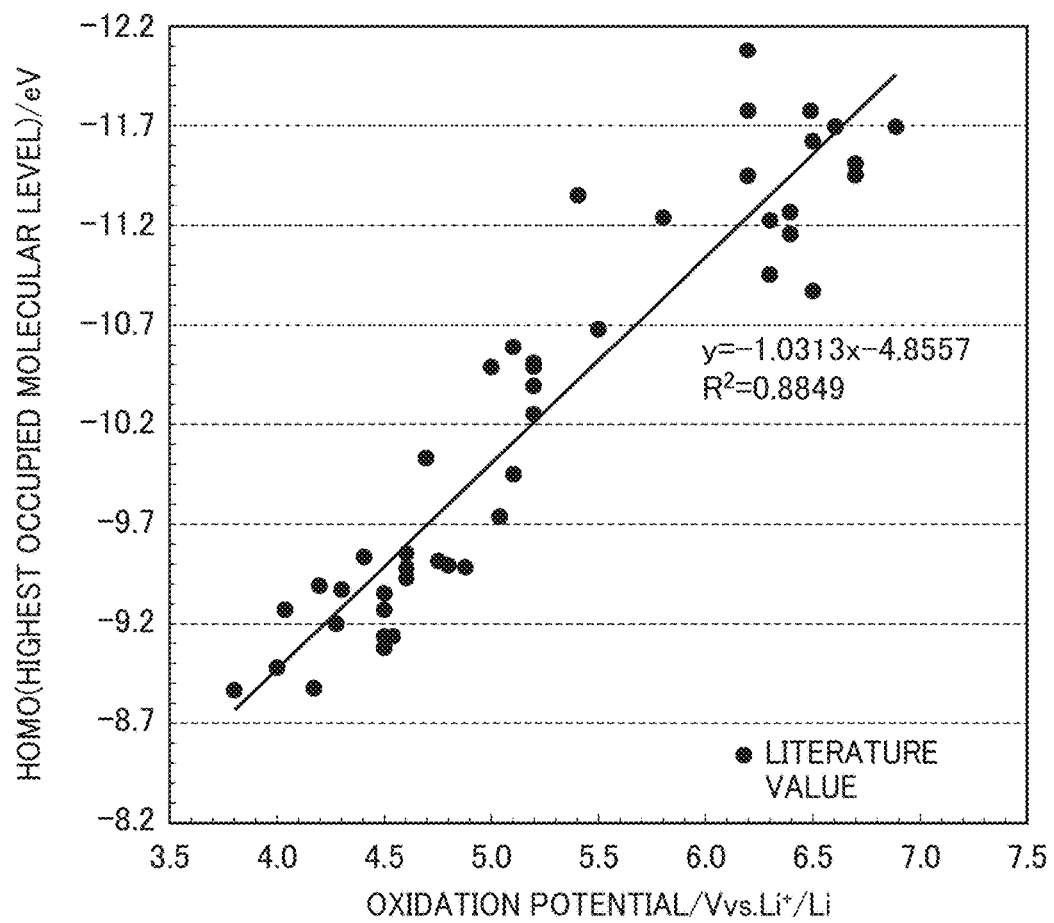

COATED LITHIUM-NICKEL COMPOSITE OXIDE PARTICLES AND METHOD FOR PRODUCING COATED LITHIUM-NICKEL COMPOSITE OXIDE PARTICLES

TECHNICAL FIELD

The present invention relates to nickel-based lithium-nickel composite oxide particles with a high content of nickel, and also relates to coated lithium-nickel composite oxide particles of which the stability under the atmosphere is improved and which are easy to handle, and a method for producing the coated lithium-nickel composite oxide particles.

BACKGROUND ART

In recent years, along with the rapid expansion of small-sized electronic devices such as cellular phones and laptop computers, a demand for a lithium-ion secondary battery as a chargeable and dischargeable power source has been rapidly increased. A lithium-cobalt oxide (hereinafter, sometimes also referred to as cobalt-based) has been widely used as a positive-electrode active substance contributing to the charging and discharging in a positive electrode of a lithium-ion secondary battery. However, capacity of the cobalt-based positive electrode has improved to the extent of theoretical capacity through the optimization of battery design, and higher capacity is becoming difficult to achieve.

Accordingly, lithium-nickel composite oxide particles using a lithium-nickel oxide that has the theoretical capacity higher than that of the conventional cobalt-based one have been developed. However, the pure lithium-nickel oxide has a problem in terms of safety, cycle characteristics, and the like because of the high reactivity with water, carbon dioxide, or the like, and is difficult to be used as a practical battery. Therefore, a lithium-nickel composite oxide to which a transition metal element such as cobalt, manganese, and iron, or aluminum is added has been developed as an improvement measure for the problem described above.

In the lithium-nickel composite oxide, there are composite oxide particles expressed by a transition metal composition of $Ni_{0.33}Co_{0.33}Mn_{0.33}$, a so-called ternary composite oxide (hereinafter, sometimes referred to as ternary), which is made by adding nickel, manganese, and cobalt in an equimolar amount, respectively, and lithium-nickel composite oxide particles with a nickel content exceeding 0.65 mol, a so-called nickel-based composite oxide (hereinafter, sometimes referred to as nickel-based). From the viewpoint of capacity, a nickel-based with a large nickel content has a great advantage as compared to a ternary.

However, the nickel-based is characterized by being more sensitive depending on the environment as compared to a cobalt-based or a ternary, because of the high reactivity with water, carbon dioxide, and the like, and absorbing moisture and carbon dioxide ($CO_2$) in the air more easily. It has been reported that the moisture and carbon dioxide are deposited on particle surfaces as impurities such as lithium hydroxide (LiOH), and lithium carbonate ($Li_2CO_3$), respectively, and have an adverse effect on the production process of a positive electrode or battery performance.

By the way, the production process of a positive electrode passes through a process in which a positive electrode mixture slurry obtained by mixing lithium-nickel composite oxide particles, a conductive auxiliary, a binder, an organic solvent, and the like is applied onto a collector made of aluminum or the like, and dried. In general, in the production process of a positive electrode mixture slurry, lithium hydroxide causes the slurry viscosity to increase rapidly by reacting with a binder, and may cause gelation of the slurry. These phenomena cause faults and defects, and a decrease of production yield of a positive electrode, and may cause a variation in quality of the products. Further, during charging and discharging, these impurities react with an electrolytic solution and sometimes generate gas, and may cause a problem in the stability of the battery.

Accordingly, in a case where a nickel-based is used as a positive-electrode active substance, in order to prevent the generation of impurities such as the above-described lithium hydroxide (LiOH), the production process of a positive electrode is required to be performed in a dry (low humidity) environment in a decarbonated atmosphere. Therefore, there is a problem that in spite of having high theoretical capacity and showing great promise as a material of a lithium-ion secondary battery, the nickel-based requires high cost for the introduction of a facility and high running costs for the facility in order to maintain the production environment, and which becomes a barrier to it becoming widespread.

In order to solve the problem described above, a method of coating surfaces of lithium-nickel composite oxide particles by using a coating agent has been proposed. Such a coating agent is roughly classified as an inorganic coating agent and an organic coating agent. As the inorganic coating agent, a material such as titanium oxide, aluminum oxide, aluminum phosphate, cobalt phosphate, fumed silica, and lithium fluoride have been proposed, and as the organic coating agent, a material such as carboxymethyl cellulose, and a fluorine-containing polymer have been proposed.

For example, in Patent Document 1, a method of forming a lithium fluoride (LiF) or fluorine-containing polymer layer on surfaces of lithium-nickel composite oxide particles has been proposed, and in Patent Document 2, a method of forming a fluorine-containing polymer layer onto lithium-nickel composite oxide particles, and further adding a Lewis acid compound to neutralize impurities has been proposed. In any processing, the surfaces of lithium-nickel composite oxide particles are modified so as to have the hydrophobic property with a coated layer containing a fluorine-based material, and adsorption of moisture is suppressed, and the deposition of impurities such as lithium hydroxide (LiOH) can be suppressed.

However, the coated layer containing the above-described fluorine-based material, which is used in these coating methods, is merely attached onto lithium-nickel composite oxide particles only by electrostatic attraction. Accordingly, the coated layer is redissolved in N-methyl-2-pyrrolidone (NMP), which is used as a solvent in the slurry production process, therefore, the coated layer is easily detached from the lithium-nickel composite oxide particles. As a result, the positive electrode is required to be stored in a dry (low humidity) environment in a decarbonated atmosphere, and not only cannot the faults and defects and the decrease of production yield, which are problems in the nickel-based, be suppressed, but also the problem with the stability of a battery substantially due to the generation of impurities cannot be thoroughly solved.

Patent Document 1: Japanese Unexamined Patent Application, Publication No. 2013-179063

Patent Document 2: Japanese Unexamined Patent Application (Translation of PCT Application), Publication No. 2011-511402

DISCLOSURE OF THE INVENTION

Problems to be Solved by the Invention

In view of the above-described problems of conventional technique, an object of the present invention is to provide coated lithium-nickel composite oxide particles that can be handled under the atmosphere, and can obtain coated films of lithium-nickel composite oxide particles, the coated films not having an adverse effect on the battery characteristics, and a method for producing the coated lithium-nickel composite oxide particles.

Means for Solving the Problems

As a result of intensive studies to solve the above-described problems of conventional technique, the present inventors have focused their attention on the fact that the surfaces of nickel-based lithium-nickel composite oxide particles shows basicity by its nature, and have found that a self-assemble monolayer is formed by coating with a pre-determined coating material that shows acidic nature. The present inventors have found that a coated lithium-nickel composite oxide on which a self-assemble monolayer has been formed by such a coating material has strong adhesion to the coated layer, and further is excellent lithium-nickel composite oxide particles that can suppress the transmission of moisture and carbon dioxide, and thus have completed the present invention.

Specifically, the present invention provides the following.

That is, a first aspect of the present invention is coated lithium-nickel composite oxide particles for a lithium-ion battery positive-electrode active substance, including: coating surfaces of nickel-based lithium-nickel composite oxide particles with a coating material, in which the coating material is a carboxyl group-containing molecule or an organic sulfur compound, and a coating amount of the carboxyl group-containing molecule or the organic sulfur compound is $4.05 \times 10^{-6}$ mol/m$^2$ or more to $1.62 \times 10^{-5}$ mol/m$^2$ or less relative to the specific surfaces area of the lithium-nickel composite oxide particles.

A second aspect of the present invention is the coated lithium-nickel composite oxide particles according to the first aspect of the invention, in which the coating material is a carboxyl group-containing molecule.

A third aspect of the present invention is the coated lithium-nickel composite oxide particles according to the second aspect of the invention, in which the carboxyl group-containing molecule is one molecule selected from the group consisting of saturated fatty acid, di-unsaturated fatty acid, tri-unsaturated fatty acid, tetra-unsaturated fatty acid, and penta-unsaturated fatty acid.

A fourth aspect of the present invention is the coated lithium-nickel composite oxide particles according to the first aspect of the invention, in which the coating material is an alkyl thiol group-containing molecule.

A fifth aspect of the present invention is the coated lithium-nickel composite oxide particles according to the fourth aspect of the invention, in which the alkyl thiol group-containing molecule is one molecule selected from the group consisting of 1-propanethiol, 1-octanethiol, and 1-hexadecanol.

A sixth aspect of the present invention is the coated lithium-nickel composite oxide particles according to the first aspect of the invention, in which the coating material is a thiol group-containing molecule having a cyclic skeleton of an aromatic ring or a heterocyclic ring, or a disulfide group-containing molecule having a cyclic skeleton of an aromatic ring or a heterocyclic ring.

A seventh aspect of the present invention is the coated lithium-nickel composite oxide particles according to the sixth aspect of the invention, in which the coating material is a disulfide group-containing molecule having a diphenyl disulfide skeleton, or a thiol group-containing molecule having a triazine dithiol skeleton.

A eighth aspect of the present invention is the coated lithium-nickel composite oxide particles according to any one of the first to seventh aspects of the invention, in which the coating material has a molecular orbital energy in the highest occupied molecular orbital of less than −9.0 eV.

A ninth aspect of the present invention is the coated lithium-nickel composite oxide particles according to any one of the first to eighth aspects of the invention, in which the nickel-based lithium-nickel composite oxide is represented by the following Formula (1), $$Li_xNi_{(1-y-z)}M_yN_zO_2 \quad (1)$$

(in the formula x is a value of 0.80 to 1.10, y is a value of 0.01 to 0.20, z is a value of 0.01 to 0.15, and 1-y-z is a value exceeding 0.65, and M represents at least one element selected from Co or Mn, and N represents at least one element selected from Al, In or Sn.)

A tenth aspect of the present invention is the coated lithium-nickel composite oxide particles according to the first to ninth aspects of the invention, in which the coated lithium-nickel composite oxide particles are spherical particles having an average particle diameter of 5 to 20 µm.

An eleventh aspect of the present invention is the coated lithium-nickel composite oxide particles according to any one of the first to tenth aspects of the invention, in which the coating material being formed on the coated lithium-nickel composite oxide particles are monomolecular films.

A twelfth aspect of the present invention is a method for producing the coated lithium-nickel composite oxide particles according to any one of the first to eleventh aspects of the invention, including: mixing the coating material and the nickel-based lithium-nickel composite oxide particles into a polar solvent at a temperature in the range from a room temperature to a temperature immediately before a decomposition temperature of the coating material.

Effects of the Invention

According to the present invention, coated lithium-nickel composite oxide particles coated with a predetermined coating material on surfaces of nickel-based lithium-nickel composite oxide particles can suppress the generation of impurities by the absorption of moisture and carbon dioxide because of the high environmental stability, and further has high adhesion so that the coated layer is not easily detached, that is, excellent coated lithium-nickel composite oxide particles are provided, and a method for producing the coated lithium-nickel composite oxide particles is also provided.

The coated lithium-nickel composite oxide particles can be provided as a high capacity composite oxide positive-electrode active substance for a lithium-ion battery, for which production equipment that has been used for a cobalt-based, and ternary can also be used instead of positive-electrode production equipment in which carbon dioxide concentration and moisture concentration are strictly controlled.

BRIEF DESCRIPTION OF THE DRAWINGS

FIG. 1 is a correlation chart of oxidation potentials of each molecular species and molecular orbital energy values in the highest occupied molecular orbital (HOMO) calculated from a molecular orbital calculation by a molecular orbital (MO) method.

PREFERRED MODE FOR CARRYING OUT THE INVENTION

Hereinafter, coated lithium-nickel composite oxide particles and a method for producing the same, according to the present invention, will be described in detail. However, the present invention should not be construed as being limited to the following detailed explanation. In the present invention, there may be a case where a secondary particle aggregated with primary particles is referred to as the lithium-nickel composite oxide particles.

[Nickel-Based Lithium-Nickel Composite Oxide Particles]

The nickel-based lithium-nickel composite oxide particles are a spherical particles, and have the average particle diameter preferably of from 5 to 20 μm. When the average particle diameter is set in the range, favorable battery performance is provided as the lithium-nickel composite oxide particles, and further favorable battery repetition life (cycle characteristics) is also provided, both can be achieved, therefore, this is preferred.

In addition, the nickel-based lithium-nickel composite oxide particles are preferably represented by the following Formula (1).

$$Li_xNi_{(1-y-z)}M_yN_zO_2 \quad (1)$$

(in the formula, x is a value of 0.80 to 1.10, y is a value of 0.01 to 0.20, z is a value of 0.01 to 0.15, and 1-y-z is a value exceeding 0.65, and M represents at least one element selected from Co or Mn, and N represents at least one element selected from Al, In or Sn.)

Further, the value of 1-y-z (nickel content) is, from the viewpoint of the capacity, preferably a value exceeding 0.70, and more preferably a value exceeding 0.80.

The cobalt-based (LCO), the ternary (NCM), and the nickel-based (NCA) have an electrode energy density (Wh/L) of 2160 Wh/L (LiCoO2), 2018.6 Wh/L (LiNi0.33Co0.33Mn0.33Co0.33O2), and 2376 Wh/L (LiNi0.8Co0.15A10.05O2), respectively. Accordingly, by using the nickel-based lithium-nickel composite oxide particles as a positive-electrode active substance of a lithium-ion battery, a battery having high capacity can be prepared.

[Carboxyl Group-Containing Molecule]

The present invention is characterized in that nickel-based lithium-nickel composite oxide particles are coated with a carboxyl group-containing molecule or an organic sulfur compound. The carboxyl group-containing molecule means a molecule having a carboxyl group (COOH group) in the molecule of carboxylic acid or the like. The carboxyl group-containing molecule that can be used for the present invention is chemically stable, or is electrochemically polymerized and becomes a film having conductivity, therefore, can form a preferable coated film without having any influence on the battery characteristics. When nickel-based lithium-nickel composite oxide particles are coated with a carboxyl group-containing molecule, a self-assemble monolayer (SAM) is formed. The driving force of the SAM formation is an acid-base reaction of a surface of the basic substrate and a carboxyl group-containing molecule shown in reaction formula (2).

$$R-COOH+HO-MOx \rightarrow RCOO-M+Ox+H_2O \quad (2)$$

By forming a salt of a carboxylic acid anion and a metal cation, fatty acid is fixed onto a surface of the substrate, and a self-assemble monolayer (SAM) grows.

The carboxyl group-containing molecule is not particularly limited as long as having a carboxyl group, and is preferably a carboxyl group-containing molecule having a molecular orbital energy in the HOMO (highest occupied molecular orbital) of less than −9.0 eV and more preferably less than −9.3 eV, and having a hydrophobic group in the carboxyl group-containing molecule. When the molecular orbital energy in the HOMO is less than −9.0 eV, and more preferably less than −9.3 eV, the carboxyl group-containing molecule is favorable without exerting any adverse effect on the battery characteristics as described later. In addition, when containing a hydrophobic group in the carboxyl group-containing molecule, the carboxyl group-containing molecule is more favorable because the moisture absorption of the nickel-based lithium-nickel composite oxide particles can be more prevented.

As the carboxyl group-containing molecule that can form such coated lithium-nickel composite oxide particles, for example, a saturated fatty acid represented by $C_nH_{2n+1}COOH$ such as ethanoic acid (acetic acid), propanoic acid (propionic acid), butanoic acid (butyric acid), pentanoic acid (valeric acid), hexanoic acid (caproic acid), heptanoic acid (enanthic acid), octanoic acid (caprylic acid), nonanoic acid (pelargonic acid), decanoic acid (capric acid), dodecanoic acid (lauric acid), tetradecanoic acid (myristic acid), hexadecanoic acid (palmitic acid), heptadecanoic acid (margaric acid), and octadecanoic acid (stearic acid); a mono-unsaturated fatty acid such as crotonic acid, myristoleic acid, palmitoleic acid, sapienic acid, oleic acid, elaidic acid, vaccenic acid, gadoleic acid, eicosenoic acid, erucic acid, and nervonic acid; a di-unsaturated fatty acid such as linoleic acid, eicosadienoic acid, and docosadienoic acid; a tri-unsaturated fatty acid such as linolenic acid, γ-linolenic acid, pinolenic acid, eleostearic acid, β-eleostearic acid, mead acid, and eicosatrienoic acid; a tetra-unsaturated fatty acid such as stearidonic acid, arachidonic acid, eicosatetraenoic acid, and adrenic acid; a penta-unsaturated fatty acid such as bosseopentaenoic acid, eicosapentaenoic acid, osbond acid, clupanodonic acid, and tetracosapentenoic acid; a hexa-unsaturated fatty acid such as docosahexaenoic acid, and nisinic acid; or a carboxyl group-containing molecule in combination thereof is preferred.

In addition to the above-described carboxyl group-containing molecule, 3-furancarboxylic acid, 3-thiophene carboxylic acid, pyrrole-3-carboxylic acid, 3-furan acetic acid, 3-thiophene acetic acid, or the like, which has a six-membered ring or a five-membered ring, or a carboxyl group-containing molecule in combination thereof is also electrolytically polymerized within the range of battery driving, and further forms films having conductivity on particle surfaces, therefore, can be preferably used.

[Organic Sulfur Compound]

The present invention is characterized in that nickel-based lithium-nickel composite oxide particles are coated with a carboxyl group-containing molecule or an organic sulfur compound. The organic sulfur compound means an organic compound containing sulfur in the molecular structure, such as a molecule having a sulfide group or a thiol group. The organic sulfur compound is, for example, an alkyl thiol group-containing molecule, a thiol group-containing molecule having a cyclic skeleton of an aromatic ring or a heterocyclic ring, or a disulfide group-containing molecule having a cyclic skeleton of an aromatic ring or a heterocyclic ring, and for example, can preferably coat lithium-nickel composite oxide particles that are basicity, because the thiol group is one of the adsorption functional groups showing acidity. In addition, the sulfur molecule in a thiol group or a disulfide group has high affinity for a transition metal, and is strongly chemically adsorbed onto lithium-nickel composite oxide particles, therefore, these can be preferably used.

The organic sulfur compound is not particularly limited as long as being an organic compound containing sulfur in the structure. Examples of the organic sulfur compound include, for example, a thiol group-containing molecule (R—SH) molecule, or a disulfide group-containing molecule (RS—SR) having a cyclic skeleton of an aromatic ring or a heterocyclic ring. The reaction mechanism of a metal (M) and an organic sulfur compound can be expressed by Formula (2), and Formula (3).

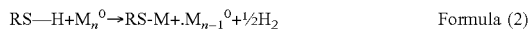

$$RS{-}H + M_n^0 \rightarrow RS{-}M{+}.M_{n-1}^0 + \tfrac{1}{2}H_2 \qquad \text{Formula (2)}$$

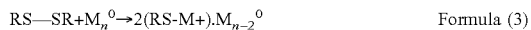

$$RS{-}SR + M_n^0 \rightarrow 2(RS{-}M+).M_{n-2}^0 \qquad \text{Formula (3)}$$

The arrangement has a regular nature determined by the arrangement of atoms on the metal surface of the substrate and the interaction between the molecules of the adsorbed organic sulfur compound. Therefore, when the selected organic sulfur compound has a hydrophobic group, the surface of the positive electrode material coated with these compounds becomes hydrophobic, and moisture absorption is prevented. Further, when the selected organic sulfur compound is electrochemically stable within the range of battery driving, there is no influence on the battery characteristics.

The organic sulfur compound is an organic sulfur compound that preferably has a molecular orbital energy value in the HOMO (highest occupied molecular orbital) of less than −9.0 eV and more preferably less than −9.3 eV, and has a hydrophobic group. When the molecular orbital energy value in the HOMO is less than −9.0 eV, and more preferably less than −9.3 eV, the organic sulfur compound is favorable without exerting any adverse effect on the battery characteristics as described later. In addition, when the organic sulfur compound contains a hydrophobic group, the moisture absorption of the lithium-nickel composite oxide particles can be more prevented, therefore, this is favorable.

Preferred examples of the organic sulfur compound include, for example, an alkylthiol-containing molecule such as ethanethiol, propanethiol, butanthiol, pentanethiol, hexanethiol, heptanethiol, octanethiol, nonanethiol, decanethiol, dodecanethiol, tetradecanethiol, hexadecanethiol, heptadecanethiol, and octadecanethiol, which is represented by chemical formula $C_nH_{2n+1}SH$; diphenyl disulfide, di-p-tolyl disulfide, bis(4-methoxylphenyl)disulfide, 2-naphthalenethiol, benzenethiol, and benzyl mercaptan, which has diphenyl disulfide as a basic skeleton; and an organic sulfur compound such as 6-(dibutylamino)-1,3,5-triazine-2,4-dithiol, 2-anilino-4,6-dimercapto-1,3,5-triazine, and 6-(anilino)-1,3,5-triazine-2,4-dithiol, which has a triazine skeleton. In addition, the alkyl group may be linear or branched.

<Redox Potential>

The molecular species has a specific redox potential, and has a correlation between the logarithm of the concentration ratio of the oxidant and the reductant and the redox potential, which is known as a Nernst equation. That is, as the molecular orbital energy level in the HOMO of the molecular species is lower, the electron is more hardly taken out, therefore, the oxidation potential increases in the positive (noble) direction, and as the molecular orbital energy level in the lowest unoccupied molecular orbital (LUMO) is higher, the electron is more hardly given out, therefore, the reduction potential increases in the negative (ignoble) direction. FIG. 1 shows a correlation chart of the oxidation potentials of each molecular species extracted from literature and the molecular orbital energy values in the HOMO calculated by a molecular orbital (MO) method. As shown in FIG. 1, there is a linear relationship between the oxidation potential of molecular species and the molecular orbital energy values in the HOMO, and the electrochemically oxidizing electric potential can be estimated from the molecular orbital energy values in the HOMO of molecular species. Herein, the lithium-ion battery driving of the nickel-based lithium-nickel composite oxide-based has an upper limit voltage of 4.0 to 4.3 V, and corresponding to this, the energy level in the HOMO is equivalent to −9.0 to −9.3 eV when converted from FIG. 1. Therefore, when a molecule having a molecular orbital energy value in the HOMO of less than −9.0 eV, and more preferably less than −9.3 eV is selected as the carboxyl group-containing molecule or organic sulfur compound of the present invention, the carboxyl group-containing molecule or organic sulfur compound does not generate the oxidation reaction on the electrode within the range of the driving voltage of a lithium-ion battery, therefore, this is particularly favorable. As a result, by coating with a carboxyl group-containing molecule or organic sulfur compound having a molecular orbital energy value in the HOMO of less than −9.0 eV, and more preferably less than −9.3 eV, more preferred coated lithium-nickel composite oxide particles can be obtained.

<Self-Assemble Monolayer (SAM)>

The carboxyl group-containing molecule and organic sulfur compound in the coated lithium-nickel composite oxide particles according to the present invention form an SAM (self-assemble monolayer), and give the coating. As described later, the SAM forms an ultrathin film, even on an inner wall of a pore, a surface having an irregular shape, or the like, and the change given to the three-dimensional shape to be coated is extremely small.

In general, a minute element such as an atom, a molecule, a fine particle, a cluster, or the like is spontaneously aggregated, and may form a regular arrangement. As one of the material processes utilizing self assembling, there is a single-layer film/multilayer film formed by the self assembling of an organic molecule. The definition of such a self-assemble layer is as follows: 1) a molecular assembly formed when an organic molecule is chemically adsorbed onto a surface of a solid; and 2) a molecular film having remarkably improved molecular orientation property and arrangement regularity when the assembly is formed and the thin film is formed, as compared to those in the molecular arrangement state when the precursor molecule is in a liquid phase or a gas phase.

When a substrate composed of a compound having an affinity for a specific substance is immersed in a solution of the compound, the molecule of the compound is chemically adsorbed onto the surface of the material, and a thin film is formed. At this time, there may be a case where by the interaction between the adsorption molecules in an adsorption process, an assembly is spontaneously formed, adsorption molecules are densely aggregated, and a uniformly oriented molecular film is formed. In particular, in a case when the adsorption molecule layer is one layer, that is, in a case when a mono-molecular film is formed, the film is called an SAM.

In a process of forming an SAM, the reaction of a substrate and a molecule is a requirement for the adsorption, therefore, the reactive functional group adsorbs in a direction facing the surface of the substrate. As time elapses, the number of adsorption molecules increases. A large number of the self-assembling molecules have a long-chain alkyl group or a benzene nucleus. Between the adjacent adsorption molecules, Van der Waals force or hydrophobic interaction act between the alkyl group chains, and π-electron interaction acts between the benzene nuclei. As a result, when the adsorption molecules are aggregated, thermodynamic stability is obtained, therefore, a mono-molecular film in which molecules have been densely aggregated is formed.

The formation of an SAM is a self-terminating type process in which the growth of the mono-molecular film is automatically terminated at the point of time when the film is completed. In order to form an ultrathin film at a molecular level having a film thickness of 1 to 2 nm, it is not necessary to control film thickness by precise process management. The coating can be performed anywhere as long as there is a gap into which adsorption molecules can come, and even on an inner wall of a pore, a surface having an irregular shape, or the like, and the change given to the three-dimensional shape to be coated is negligibly small.

Growth of the SAM depends on the specific chemical reaction of a substrate and an organic molecule, and in order to form the SAM, a specific combination of a substrate and a molecule is required. The surfaces of nickel-based lithium-nickel composite oxide particles are basicity, therefore, it is effective to select an adsorption functional group such as a carboxyl group-containing molecule or an organic sulfur compound, which shows acidity.

[Method for Producing Coated Lithium-Nickel Composite Oxide Particles]

As a method for producing coated lithium-nickel composite oxide particles, that is, as a method for coating nickel-based lithium-nickel composite oxide particles with a carboxyl group-containing molecule or an organic sulfur compound, for example, there is a method in which by directly mixing a carboxyl group-containing molecule or an organic sulfur compound with nickel-based lithium-nickel composite oxide particles in a solution within the temperature range of from room temperature to a temperature immediately before the decomposition temperature of the molecule, the coating can be performed. In particular, the molecule is softened or melted by heating, and the homogeneity of the coating can be improved, therefore, this is particularly preferred.

The mixing time is desirably determined in accordance with the temperature in a solution. This is because the diffusion of molecules in a solution increases along with the temperature increase, and when the temperature is low, the mixing time is required to be longer. Coating with a carboxyl group-containing molecule or an organic sulfur compound can be performed when the mixing time is in the range of 30 seconds to 10 hours. The solvent used for the mixing is not particularly limited as long as being a highly polar solvent, and water is particularly preferably used because of being excellent in terms of cost and characteristics.

The amount of the carboxyl group-containing molecule or organic sulfur compound used in a method according to the present invention is preferably $4.05 \times 10^{-6}$ mol/m$^2$ to $1.62 \times 10^{-5}$ mol/m$^2$ per specific surface area of nickel-based lithium-nickel composite oxide particles, and more preferably $8.10 \times 10^{-6}$ mol/m$^2$ to $1.62 \times 10^{-5}$ mol/m$^2$. When the amount exceeds $1.62 \times 10^{-5}$ mol/m$^2$, the excessive amount of the carboxyl group-containing molecule or organic sulfur compound may give an adverse effect on the negative electrode, and cause a decrease of charge capacity/discharge capacity at the time of cycles. In addition, when the amount is less than $4.05 \times 10^{-6}$ mol/m$^2$, the coating amount on the particles is small, and the effect tends to be difficult to obtain.

EXAMPLES

Hereinafter, Examples of the present invention will be specifically described with Comparative Examples. However, the present invention should not be limited to the following Examples.

Example 1

15 g of the composite oxide particles represented by the transition metal composition of $Li_{1.03}Ni_{0.82}Co_{0.15}Al_{0.03}$ as nickel-based lithium-nickel composite oxide particles, 20 ml of water, and 0.087 g (corresponding to $1.62 \times 10^{-5}$ mol/m$^2$) of stearic acid were mixed at room temperature. This mixing was performed at a peripheral speed of 10.5 m/s for one minute of stirring time using a homogenizer. After the mixing, water was separated by suction filtration, then the resultant mixture was dried at 80° C. for 5 hours under reduced pressure to prepare coated lithium-nickel composite oxide particles, and the following evaluations were performed.

Example 2

Coated lithium-nickel composite oxide particles were prepared in the same manner as in Example 1 except that the additive amount of the stearic acid as a coating material was changed to 0.0435 g (corresponding to $8.10 \times 10^{-6}$ mol/m$^2$), and the following evaluations were performed.

Example 3

Coated lithium-nickel composite oxide particles were prepared in the same manner as in Example 1 except that the additive amount of the stearic acid as a coating material was changed to 0.0218 g (corresponding to $4.05 \times 10^{-6}$ mol/m$^2$), and the following evaluations were performed.

Example 4

Coated lithium-nickel composite oxide particles were prepared in the same manner as in Example 1 except that 0.0858 g (corresponding to $1.62 \times 10^{-5}$ mol/m$^2$) of linoleic acid was used as a coating material, and the following evaluations were performed.

Coated lithium-nickel composite oxide particles were prepared in the same manner as in Example 1 except that 0.0852 g (corresponding to $1.62 \times 10^{-5}$ mol/m$^2$) of linolenic acid was used as a coating material, and the following evaluations were performed.

Example 6

Coated lithium-nickel composite oxide particle were prepared in the same manner as in Example 1 except that 0.0435 g (corresponding to $1.62 \times 10^{5}$ mol/m$^2$) of 3-thiophene acetic acid was used as a coating material, and the following evaluations were performed.

Example 7

Coated lithium-nickel composite oxide particles were prepared in the same manner as in Example 1 except that 0.0343 g (corresponding to $1.62 \times 10^{-5}$ mol/m$^2$) of 3-furan acetic acid was used as a coating material, and the following evaluations were performed.

Example 8

15 g of the composite oxide particles represented by the transition metal composition of $Li_{1.03}Ni_{0.82}Co_{0.15}Al_{0.03}$ as nickel-based lithium-nickel composite oxide particles, 20 ml of water, and 0.0233 g (corresponding to $1.62 \times 10^{-5}$ mol/m$^2$) of 1-propane thiol were mixed at room temperature. This mixing was performed at a peripheral speed of 10.5 m/s for one minute of stirring time using a homogenizer. After the mixing, water was separated by suction filtration, then the resultant mixture was dried at 100° C. for 2 hours under reduced pressure to prepare coated lithium-nickel composite oxide particles, and the following evaluations were performed.

Example 9

Coated lithium-nickel composite oxide particles were prepared in the same manner as in Example 8 except that the additive amount of the 1-propanethiol as a coating material was changed to 0.0116 g (corresponding to $8.10 \times 10^{-6}$ mol/m$^2$), and the following evaluations were performed.

Example 10

Coated lithium-nickel composite oxide particles were prepared in the same manner as in Example 8 except that the additive amount of the 1-propanethiol as a coating material was changed to 0.0058 g (corresponding to $4.05 \times 10^{-6}$ mol/m$^2$), and the following evaluations were performed.

Example 11

Coated lithium-nickel composite oxide particles were prepared in the same manner as in Example 8 except that 0.0447 g (corresponding to $1.62 \times 10^{-5}$ mol/m$^2$) of 1-octanethiol was used as a coating material.

Example 12

Coated lithium-nickel composite oxide particles were prepared in the same manner as in Example 8 except that 0.0791 g (corresponding to $1.62 \times 10^{-5}$ mol/m$^2$) of 1-hexadecanethiol was used as a coating material.

Example 13

15 g of the composite oxide particles represented by the transition metal composition of $Li_{1.03}Ni_{0.82}Co_{0.15}Al_{0.03}$ as nickel-based lithium-nickel composite oxide particles, 20 ml of water, and 0.0668 g (corresponding to $1.62 \times 10^{-5}$ mol/m$^2$) of diphenyl disulfide were mixed at room temperature. This mixing was performed at a peripheral speed of 10.5 m/s for one minute of stirring time using a homogenizer. After the mixing, water was separated by suction filtration, then the resultant mixture was dried at 100° C. for 2 hours under reduced pressure to prepare coated lithium-nickel composite oxide particles, and the following evaluations were performed.

Example 14

Coated lithium-nickel composite oxide particles were prepared in the same manner as in Example 13 except that the additive amount of the diphenyl disulfide as a coating material was changed to 0.0334 g (corresponding to $8.10 \times 10^{-6}$ mol/m$^2$), and the following evaluations were performed.

Example 15

Coated lithium-nickel composite oxide particles were prepared in the same manner as in Example 13 except that the additive amount of the diphenyl disulfide as a coating material was changed to 0.0167 g (corresponding to $4.05 \times 10^{-6}$ mol/m$^2$), and the following evaluations were performed.

Example 16

Coated lithium-nickel composite oxide particles were prepared in the same manner as in Example 13 except that 0.0490 g (corresponding to $1.62 \times 10^{-5}$ mol/m$^2$) of 2-naphthalenethiol was used as a coating material, and the following evaluations were performed.

Example 17

Coated lithium-nickel composite oxide particles were prepared in the same manner as in Example 13 except that 0.0245 g (corresponding to $8.10 \times 10^{-6}$ mol/m$^2$) of 2-naphthalenethiol was used as a coating material, and the following evaluations were performed.

Example 18

Coated lithium-nickel composite oxide particles were prepared in the same manner as in Example 13 except that 0.0123 g (corresponding to $4.05 \times 10^{-6}$ mol/m$^2$) of 2-naphthalenethiol was used as a coating material, and the following evaluations were performed.

Example 19

Coated lithium-nickel composite oxide particles were prepared in the same manner as in Example 13 except that 0.0833 g (corresponding to $1.62 \times 10^{-5}$ mol/m$^2$) of 6-(dibutylamino)-1,3,5-triazine-2,4-dithiol was used as a coating material, and the following evaluations were performed.

Example 20

Coated lithium-nickel composite oxide particles were prepared in the same manner as in Example 13 except that 0.0723 g (corresponding to $1.62 \times 10^{-5}$ mol/m$^2$) of 6-(anilino)-1,3,5-triazine-2,4-dithiol was used as a coating material, and the following evaluations were performed.

Comparative Example 1

Lithium-nickel composite oxide particles for which the coating treatment according to Example 1 had not been performed were evaluated.

Comparative Example 2

Coated lithium-nickel composite oxide particles were prepared in the same manner as in Example 1 except that the additive amount of the stearic acid as a coating material was changed to 0.0109 g (corresponding to $2.03 \times 10^{-6}$ mol/m$^2$), and the following evaluations were performed.

Comparative Example 3

Coated lithium-nickel composite oxide particles were prepared in the same manner as in Example 8 except that the additive amount of the 1-propanethiol as a coating material was changed to 0.0029 g (corresponding to $2.03 \times 10^{-6}$ mol/m$^2$), and the following evaluations were performed.

Comparative Example 4

Coated lithium-nickel composite oxide particles were prepared in the same manner as in Example 13 except that the additive amount of the diphenyl disulfide as a coating material was changed to 0.0083 g (corresponding to $2.03 \times 10^{-6}$ mol/m$^2$), and the following evaluations were performed.

Comparative Example 5

Coated lithium-nickel composite oxide particles were prepared in the same manner as in Example 16 except that the additive amount of the 2-naphthalenethiol as a coating material was changed to 0.0061 g (corresponding to $2.03 \times 10^{-6}$ mol/m$^2$), and the following evaluations were performed.

<Environmental Stability Test>

Environmental stability of each of the Examples and Comparative Examples was evaluated by using the rate of change in mass when coated lithium-nickel composite oxide particles were exposed in an atmosphere at a temperature of 30° C. and a humidity of 70% RH for one week. The mass increase compared to the initial mass of around 2.0 g of particles in each of the Examples and Comparative Examples is shown by % by mass in Table 1.

From Table 1, it can be understood that each of the coated lithium-nickel composite oxide particles in Examples 1 to 20 according to the present invention has a mass change of less than 1.60%, and is lithium-nickel composite oxide particles having high environmental stability. On the other hand, it was confirmed that each of the lithium-nickel composite oxide particles in Comparative Examples 1 to 5 has a larger mass change as compared to that in Examples 1 to 20, and is lithium-nickel composite oxide particles having poor environmental stability.

<Gelation Test>

As to the measurement of change over time of the viscosity of the positive electrode mixture slurry, a positive electrode mixture slurry was prepared in the following order, and then the increase of viscosity and the gelation were observed.

As for the mixing ratio, lithium-nickel composite oxide particles according to the Examples and Comparative Example, a conductive auxiliary, a binder, N-methyl-2-pyrrolidone (NMP) were weighed so that the mass ratio of the lithium-nickel composite oxide particles:the conductive auxiliary:the binder:the NMP was 45:2.5:2.5:50, further 1.5% by mass of water was added, then the resultant mixture was stirred by a rotation-revolution mixer, and a positive electrode mixture slurry was obtained. The obtained slurry was stored in an incubator at 25° C., the changes after 24 hours were respectively evaluated for the viscosity increase and the degree of gelation by stir mixing with a spatula in Examples and Comparative Examples, and are shown in Table 1. Further, after being left for 24 hours, a positive electrode mixture slurry having flowability was expressed as "○", and a positive electrode mixture slurry transforming to a jelly state and turning into a gel was expressed as "×".

From Table 1, it can be understood that all of the coated lithium-nickel composite oxide particles in Examples 1 to 20 according to the present invention do not cause the gelation, and even in a case when the particles are slurried, favorable coated lithium-nickel composite oxide particles are formed without the coated films peeling off. On the other hand, it was confirmed that all of the lithium-nickel composite oxide particles in Comparative Examples 1 and 2 turn into a gel in a case when the particles are slurried, therefore are lithium-nickel composite oxide particles in which the generation of impurities cannot be suppressed, the suppression of the generation of impurities is an object of the present invention.

TABLE 1

| | Coating material | Additive amount (mol/m$^2$) | HOMO (eV) | Mass change (%) | Positive electrode mixture slurry gelation |
|---|---|---|---|---|---|
| Example1 | Stearic acid | $1.62 \times 10^{-5}$ | −10.838 | 0.50 | ○ |
| Example2 | Stearic acid | $8.10 \times 10^{-6}$ | −10.838 | 0.81 | ○ |
| Example3 | Stearic acid | $4.05 \times 10^{-6}$ | −10.838 | 1.38 | ○ |
| Example4 | Linoleic acid | $1.62 \times 10^{-5}$ | −9.592 | 0.54 | ○ |
| Example5 | Linolenic acid | $1.62 \times 10^{-5}$ | −9.633 | 0.60 | ○ |
| Example6 | 3-Thiophene acetic acid | $1.62 \times 10^{-5}$ | −9.635 | 1.40 | ○ |
| Example7 | 3-Furan acetic acid | $1.62 \times 10^{-5}$ | −9.856 | 1.20 | ○ |
| Example8 | 1-Propanethiol | $1.62 \times 10^{-5}$ | −9.255 | 1.05 | ○ |
| Example9 | 1-Propanethiol | $8.10 \times 10^{-6}$ | −9.255 | 1.18 | ○ |
| Example10 | 1-Propanethiol | $4.05 \times 10^{-6}$ | −9.255 | 1.40 | ○ |
| Example11 | 1-Octanethiol | $1.62 \times 10^{-5}$ | −9.168 | 0.65 | ○ |
| Example12 | 1-Hexadecanethiol | $1.62 \times 10^{-5}$ | −9.145 | 0.62 | ○ |
| Example13 | Diphenyl disulfide | $1.62 \times 10^{-5}$ | −9.248 | 1.41 | ○ |
| Example14 | Diphenyl disulfide | $8.10 \times 10^{-6}$ | −9.248 | 1.45 | ○ |
| Example15 | Diphenyl disulfide | $4.05 \times 10^{-6}$ | −9.248 | 1.56 | ○ |
| Example16 | 2-Naphthalenethiol | $1.62 \times 10^{-5}$ | −8.564 | 1.16 | ○ |
| Example17 | 2-Naphthalenethiol | $8.10 \times 10^{-6}$ | −8.564 | 1.32 | ○ |
| Example18 | 2-Naphthalenethiol | $4.05 \times 10^{-6}$ | −8.564 | 1.40 | ○ |
| Example19 | 6-(Dibutylamino)-1,3,5-triazine-2,4-dithiol | $1.62 \times 10^{-5}$ | −9.248 | 0.83 | ○ |
| Example20 | 6-(Anilino)-1,3,5-triazine-2,4-dithiol | $1.62 \times 10^{-5}$ | −9.154 | 0.67 | ○ |
| Comparative Example1 | — | — | — | 2.04 | × |
| Comparative Example2 | Stearic acid | $2.03 \times 10^{-6}$ | −10.838 | 1.80 | × |
| Comparative Example3 | 1-Propanethiol | $2.03 \times 10^{-6}$ | −9.255 | 1.82 | ○ |
| Comparative Example4 | Diphenyl disulfide | $2.03 \times 10^{-6}$ | −9.248 | 1.90 | ○ |
| Comparative Example5 | 2-Naphthalenethiol | $2.03 \times 10^{-6}$ | −8.564 | 1.89 | ○ |

In addition, in a case when the lithium-nickel composite oxide particles were coated with a fluorine compound, the fluorine compound is dissolved generally into N-methyl-2-pyrrolidone (NMP), therefore, it is considered that even though the lithium-nickel composite oxide particles have been coated with the fluorine compound, the coated films are dissolved. Accordingly, it is considered that the lithium-nickel composite oxide particles coated with a fluorine compound are different from the coated lithium-nickel composite oxide particles according to Examples, and it is difficult to suppress the generation of impurities when the produced positive electrode is stored. Therefore, it is difficult to suppress the reaction with an electrolytic solution accompanied by gas generation in battery driving, which is caused by the impurities generated during the storage of positive electrodes, and an expensive storage facility is required.

In addition, the value of energy level in the HOMO of the carboxyl group-containing molecule or organic sulfur compound used for the coating in each of the Examples 1 to 15, 19, and 20 is lower than −9.0 eV. Accordingly, when the coated lithium-nickel composite oxide particles in each of the Examples 1 to 15, 19, and 20 are used as a positive-electrode active substance of a lithium-ion battery, the carboxyl group-containing molecule or organic sulfur compound does not generate any oxidation reaction on the electrode, therefore, it is inferred that the coated lithium-nickel composite oxide particles are more favorable coated lithium-nickel composite oxide particles for a lithium-ion battery positive-electrode active substance.

The invention claimed is:

1. Coated lithium-nickel composite oxide particles for a lithium-ion battery positive-electrode active substance, comprising: coating surfaces of nickel-based lithium-nickel composite oxide particles with a coating material, wherein
   the coating material is at least one selected from the group consisting of a carboxyl group-containing molecule, and an alkyl thiol group-containing molecule,
   the alkyl thiol group-containing molecule is one molecule selected from the group consisting of 1-propanethiol, 1-octanethiol, and 1-hexadecanethiol,
   the carboxyl group-containing molecule is one molecule selected from the group consisting of saturated fatty acid, di-unsaturated fatty acid, tri-unsaturated fatty acid, tetra-unsaturated fatty acid, and penta-unsaturated fatty acid, 3-furancarboxylic acid, 3-thiophene carboxylic acid, pyrrole-3-carboxylic acid, 3-furan acetic acid, and 3-thiophene acetic acid, and
   a coating amount of the coating material is $4.05 \times 10^{-6}$ mol/m$^2$ or more to $1.62 \times 10^{-5}$ mol/m$^2$ or less relative to the specific surface area of the lithium-nickel composite oxide particles.

2. The coated lithium-nickel composite oxide particles according to claim 1, wherein the coating material has a molecular orbital energy in the highest occupied molecular orbital of less than −9.0 eV.

3. The coated lithium-nickel composite oxide particles according to claim 1, wherein the nickel-based lithium-nickel composite oxide is represented by the following Formula (1), $$Li_xNi_{(1-y-z)}M_yN_zO_2 \qquad (1)$$

wherein x is a value of 0.80 to 1.10, y is a value of 0.01 to 0.20, z is a value of 0.01 to 0.15, and 1-y-z is a value exceeding 0.65, and M represents at least one element selected from Co or Mn, and N represents at least one element selected from Al, In or Sn.

4. The coated lithium-nickel composite oxide particles according to claim 1, wherein the coated lithium-nickel composite oxide particles are spherical particles having an average particle diameter of 5 to 20 μm.

5. The coated lithium-nickel composite oxide particles according to claim 1, wherein the coating material being formed on the coated lithium-nickel composite oxide particles is monomolecular films.

6. A method for producing the coated lithium-nickel composite oxide particles according to claim 1, comprising: mixing the coating material and the nickel-based lithium-nickel composite oxide particles into a polar solvent at a temperature in the range from a room temperature to a temperature immediately before a decomposition temperature of the coating material.

7. The coated lithium-nickel composite oxide particles according to claim 1, wherein the carboxyl group-containing molecule is at least one selected from the group consisting of ethanoic acid (acetic acid), propanoic acid (propionic acid), butanoic acid (butyric acid), pentanoic acid (valeric acid), hexanoic acid (caproic acid), heptanoic acid (enanthic acid), octanoic acid (caprylic acid), nonanoic acid (pelargonic acid), decanoic acid (capric, acid), dodecanoic acid (lauric acid), tetradecanoic acid (myristic acid), hexadecanoic acid (palmitic acid), heptadecanoic acid (margaric acid), octadecanoic acid (stearic acid), crotonic acid, myristoleic acid, palmitoleic acid, sapienic acid, oleic acid, elaidic acid, vaccenic acid, gadoleic acid, eicosenoic acid, erucic acid, nervonic acid, linoleic acid, eicosadienoic acid, docosadienoic acid, linolenic acid, γ-linolenic acid, pinolenic acid, eleostearic acid, β-eleostearic acid, mead acid, eicosatrienoic acid, stearidonic acid, arachidonic acid, eicosatetraenoic acid, adrenic acid, bosseopentaenoic acid, eicosapentaenoic acid, osbond acid, clupanodonic acid, tetracosapentenoic acid, docosahexaenoic acid, nisinic acid, 3-furancarboxylic acid, 3-thiophene carboxylic acid, pyrrole-3-carboxylic acid, 3-furan acetic acid, and 3-thiophene acetic acid.

8. The coated lithium-nickel composite oxide particles according to claim 1, wherein the coating material comprises at least the alkyl thiol group-containing molecule.

* * * * *